United States Patent [19]

Ota

[11] Patent Number: 5,467,432
[45] Date of Patent: Nov. 14, 1995

[54] PRINTER CONTROLLER CAPABLE OF OPERATING WITH DIFFERENT OPERATION MODES BASED ON MODE-DETERMINATIVE CODES STORED IN POINT-TABLE MEMORY

[75] Inventor: Yuichi Ota, Anjo, Japan

[73] Assignee: Brother Kogyo Kabushiki Kaisha, Aichi, Japan

[21] Appl. No.: 29,381

[22] Filed: Mar. 10, 1993

[30] Foreign Application Priority Data

Mar. 13, 1992 [JP] Japan ................................. 4-055411

[51] Int. Cl.⁶ .............................. G06K 15/02; G06F 3/12
[52] U.S. Cl. .................. 395/112; 395/101; 395/500; 364/235; 364/930
[58] Field of Search ........................ 395/112, 101, 395/500; 400/61–62, 76–77; 358/448, 468

[56] References Cited

U.S. PATENT DOCUMENTS

| | | | |
|---|---|---|---|
| 4,756,636 | 7/1988 | Marayama et al. | 400/624 |
| 4,870,611 | 9/1989 | Martin et al. | 395/147 |
| 4,968,159 | 11/1990 | Sasaki et al. | 400/76 |
| 4,992,956 | 2/1991 | Kaku et al. | 364/519 |
| 4,992,957 | 2/1991 | Aoyama et al. | 395/112 |
| 4,994,988 | 2/1991 | Yokoi | 364/519 |
| 5,010,514 | 4/1991 | Kippenhan et al. | 395/275 |
| 5,050,098 | 9/1991 | Brown, III et al. | 364/519 |
| 5,075,841 | 12/1991 | Kaneko | 395/575 |
| 5,129,949 | 7/1992 | Cuzzo et al. | 395/113 |
| 5,140,675 | 8/1992 | Okada | 395/114 |
| 5,146,544 | 9/1992 | Altham et al. | 395/115 |
| 5,165,014 | 11/1992 | Vassar | 395/112 |
| 5,293,466 | 3/1994 | Bringmann | 395/114 |
| 5,303,336 | 4/1994 | Kageyama et al. | 395/114 |

FOREIGN PATENT DOCUMENTS

63-216756  9/1988  Japan.

*Primary Examiner*—Krisna Lim
*Attorney, Agent, or Firm*—Oliff & Berridge

[57] ABSTRACT

A printer controller capable of emulating two or more types of printers which operate in different operation modes, the emulator being operable according to each batch of print data in selected a selected one of the different modes. The emulator includes a print data memory for storing a received batch of print data, which contains character codes and mode-determinative codes, and a point-table memory for storing point tables corresponding to the different operation modes, each point table listing predetermined points to be given to the mode-determinative codes, respectively. The points indicate degrees of probability that each operation mode corresponding to each table is selected as an effective operation mode for the relevant batch of print data. The emulator is provided with a device for scanning the point tables, summing the points of the mode-determinative codes included in the received print data, to obtain sums of the points for all the different operation modes, and determining one of the operation modes as the effective operation mode on the basis of the sums obtained for the different operation modes.

16 Claims, 8 Drawing Sheets

| POINT TABLE A FOR OPERATION MODE A | |
|---|---|
| MODE-DETERMINATIVE CODES | POINTS GIVEN |
| ESC A | 75 |
| ESC B | 70 |
| ESC CD | 30 |
| ESC CE | 30 |
| ESC CF | 30 |

FIG. 4B

| CONTROL TABLE B FOR OPERATION MODE B | |
|---|---|
| MODE-DETERMINATIVE CODES | POINTS GIVEN |
| ESC A | 5 |
| ESC B | 50 |
| ESC E | 50 |
| ESC F | 50 |
| ESC G | 101 |
| ESC H | 101 |

FIG. 4C

| CONTROL TABLE C FOR OPERATION MODE C | |
|---|---|
| MODE-DETERMINATIVE CODES | POINTS GIVEN |
| ESC A | 75 |
| ESC B | 30 |
| ESC CD | 70 |
| ESC CE | 70 |
| ESC CF | 70 |
| ESC E | 10 |
| ESC F | 10 |

PRINTER CONTROLLER CAPABLE OF OPERATING WITH DIFFERENT OPERATION MODES BASED ON MODE-DETERMINATIVE CODES STORED IN POINT-TABLE MEMORY

BACKGROUND OF THE INVENTION

1. Field of the Invention

The present invention relates in general to a printer controller capable of emulating a plurality of printers having different operation modes, and more particularly to such a printer controller capable of determining or selecting one of the operation modes, on the basis of control codes included in the print data, so that the printing operation is effected by the controller in the selected operation mode.

2. Discussion of the Prior Art

Generally, a printer operating according to a received batch of print data is adapted to perform a printing operation wherein characters such as alphabetic letters, numerals and symbols represented by character codes included in the print data are printed according to various control codes also included in the print data. Examples of such control codes that influence the printing operation are codes specifying the size of the characters, a code for carriage return and line feed motions of the printer, and a code for pagination of the printed text. For improved printing quality and versatility, most of the printers currently available are operable in two or more different operation modes, which are established by appropriate control codes included in a batch of print data received by the printers.

For instance, a printer has a plurality of operation modes which correspond to respective combinations of printing speed (high-speed printing or low-speed printing) and image resolution value (high-resolution or low-resolution, which is determined by the number of dots per inch in the case of a dot-matrix printer). Thus, the operation modes are established by respective combinations of two or more control codes, which include so-called "function-expanding control codes", each of which follow;an ESC code and which include those for specifying the printing speed and the image resolution value indicated above. In the above example, the operation modes includes, for instance, a mode in which a printing operation is effected at high speed with low image resolution powder.

The operation modes available on one type of printer are often different from those on another type of printer in some aspects or other. In other words, the combinations of the control codes or function-expanding control codes available on one type of printer may be different from those available on another type. Therefore, the appropriate type of printer must be used to perform a printing job in the desired mode. More specifically, a printing job represented by a given batch of print data must be performed on the printer having the operation mode which meets the control codes included in the print data.

In view of the inconvenience indicated above, there has been recently proposed and developed a printer adapted to be operable in operation modes which are available on other printers. When the user of the printer in question wishes to print according to a particular batch of print data, the user must select or establish one of the operation modes which meets the control codes used in that particular print data.

To select the appropriate operation modes on the above type of printer, however, the user is required to have a thorough knowledge on the individual operation modes, so that the user may establish the suitable operation mode by suitably manipulating the printer. Since the manipulation is complicated and cumbersome, the user who is unfamiliar with the operation modes may encounter difficulty in selecting the operation mode corresponding to the print data.

In the light of the prior art described above, the assignee of the present application proposed a printer controller as disclosed in pending U.S. application Ser. No. 08/181,453 filed Jan. 14, 1994 which is a continuation of Ser. No. 07/908,992, filed Jul. 6, 1992, now abandoned, which is an improvement over a printer controller as disposed in JP-A-63-216765 which corresponds to U.S. Pat. No. 4,968,159 to Sasaki et al. The printer controller proposed by the present assignee is capable of emulating a plurality of printers which operate in different operation modes. In operation, the controller analyzes mode-determinative codes included in a predetermined initial or leading portion of a received batch of print data, so as to determine one of the operation modes as an effective operation mode in which the received batch of print data is executed to perform a printing operation. The mode-determinative codes are those control codes which contribute to the determination of an operation mode in which the printer controller is operated according to the received batch of print data. Since the appropriate operation mode is automatically selected and established by the printer controller, without complicated manipulation of the printer controller, even the unexperienced user is able to use the printer controller to perform printing jobs in desired operation modes according to respective batches of print data.

However, the present applicant found a drawback in the printer controller having a function of automatic selection of an operation mode as discussed above. That is, the mere analysis of the individual mode-determinative codes included in the relevant print data is not sufficient to assure accurate determination of the suitable operation mode which meets the received batch of print data. There are some cases in which a received batch of print data include mode-determinative codes which are commonly used for different operation modes. These common mode-determinative codes may lead to erroneous determination of the effective operation mode in which the received batch of print data is executed to perform a printing operation.

SUMMARY OF THE INVENTION

It is therefore an object of the present invention to provide a printer controller capable of automatically determining or selecting the effective operation mode for a received batch of print data, with high accuracy and reliability, even where the received batch of print data includes common control codes used for different operation modes.

The above object may be achieved according to the principle of the present invention, which provides a printer controller having a function of emulating a plurality of types of printers which operate in different operation modes, the printer controller being operable according to one of a plurality of batches of print data in a selected one of the operation modes of the plurality of printers, the printer controller comprising: (a) print data memory means for storing a received batch of print data, the received batch of print data including character codes and mode-determinative codes; (b) point-table memory means for storing point tables corresponding to the different operation modes, each of the point tables listing predetermined points to be given to the mode-determinative codes, respectively, the predetermined points being indicative of degrees of probability that each of the different operation modes which corresponds to the each point table is the selected operation mode; and (c) mode determining means for scanning the point tables, summing the points of the mode-determinative codes included in the received batch of print data, to obtain a sum of the points for each of the different operation modes, and determining one of the operation modes as an effective operation mode on the basis of the sums obtained for the different operation modes.

In the printer controller of the present invention constructed as described above, the batch of print data received from an external device is stored in the print data memory means, and the mode-determinative codes included in the stored print data are given the appropriate points by the mode determining means, for each of the different operation modes, by reference to the point tables stored in the point-table memory means, which are scanned by the mode determining means. The mode determining means obtains the sums of the points for all the operation modes, and determine or select one of the operation modes as the effective operation mode, on the basis of the obtained sums. Thus, the operation mode which meets the specific batch of print data received from the external device can be selected with high accuracy and reliability.

The points listed in the point tables for the respective different operation modes are determined to indicate degrees of probability that the mode-determinative codes to which the points are given are included in each of received batches of print data which is written so as to be executed in each of the different operation modes. According to this arrangement, it is possible to formulate or design the point tables so that a given mode-determinative code used as a control code for two or more different operation modes is given different points depending upon the operation modes. Therefore, the sums of the points of the mode-determinative codes for the respective different operation modes obtained from the respective point tables differ due to the difference of the points given to the same common mode-determinative code depending upon the operation modes. Accordingly, the present arrangement is capable of selecting, with high accuracy, one of the different operation modes as the effective operation mode in which the printer controller operates according to the received batch of print data which uses the mode-determinative codes including such common mode-determinative code.

It is a second object of this invention to provide a method by which one of a plurality of operation modes of a printer can be selected with high accuracy and reliability, on the basis of mode-determinative codes included in a batch of print data received by the printer, The above second object may be accomplished according to another aspect of this invention, which provides a method for selecting one of a plurality of different operation modes in which a printer operates to perform a printing operation according to a batch of print data, the method comprising the steps of: (i) receiving the batch of print data, the batch of print data including character codes and mode-determinative codes; (ii) preparing point tables corresponding to the different operation modes, each of the point tables listing predetermined points to be given to the mode-determinative codes, respectively, the predetermined points being indicative of degrees of probability that each of the different operation modes which corresponds to the each point table is selected; and (iii) scanning the point tables, summing the points of the mode-determinative codes included in the batch of print data, to obtain a sum of the points for each of the different operation modes, and selecting one of the operation modes on the basis of the sums obtained for the different operation modes.

The present method has the same advantage as described above with respect to the printer controller described above.

BRIEF DESCRIPTION OF THE DRAWINGS

The above and other objects, features and advantages of the present invention will become more apparent by reading the following detailed description of presently preferred embodiments of the invention, when considered in conjunction with the accompanying drawings, in which.

DETAILED DESCRIPTION OF THE PREFERRED EMBODIMENTS

Figure 1:
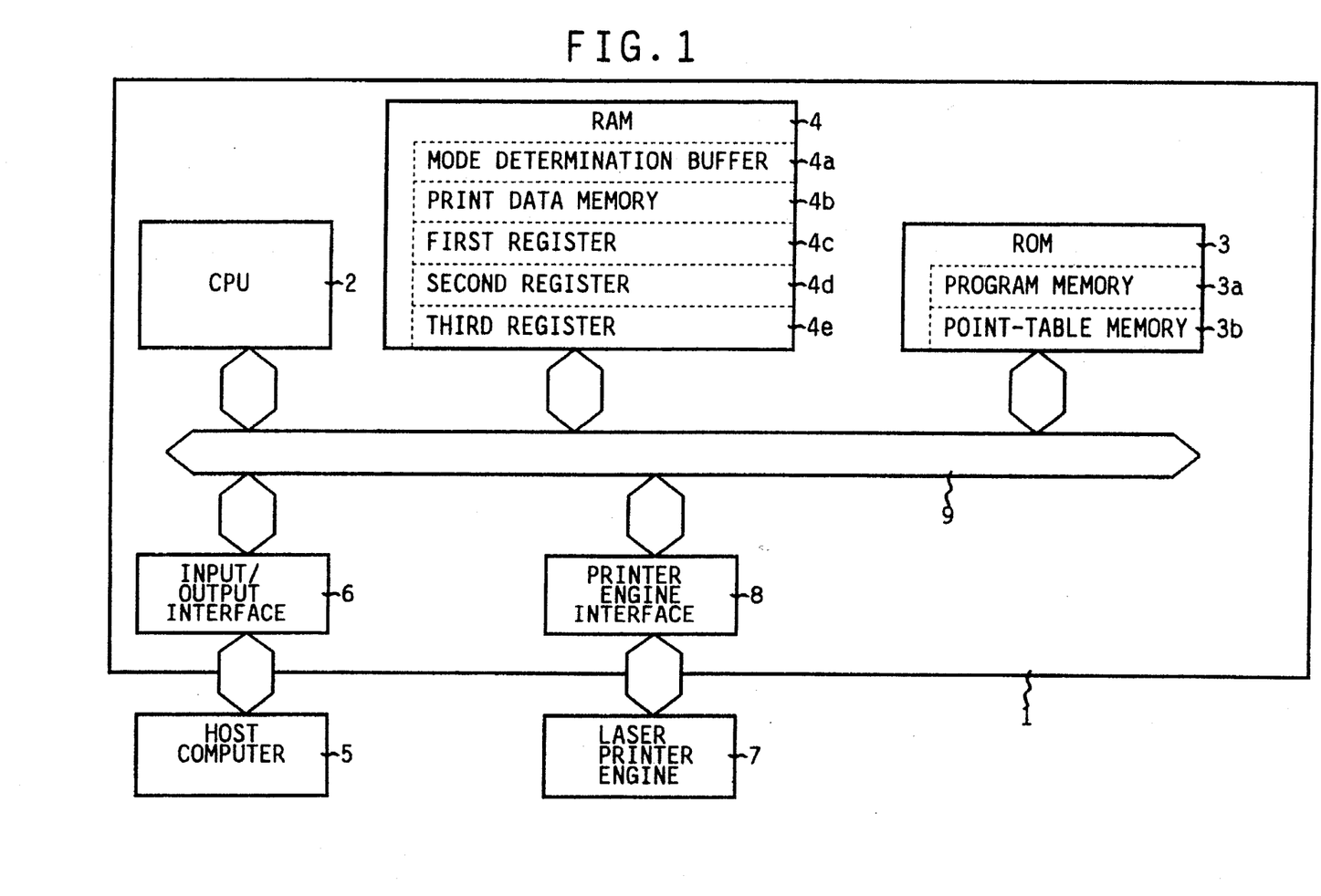
FIG. 1 is a schematic block diagram showing a a laser printer equipped with a printer controller constructed according to one embodiment of the present invention.

Referring first to FIG. 1, a laser printer uses a printer controller in the form of a control device 1, and has a laser printer engine 7 connected to the control device 1. The laser printer is connected to an external device in the form of a host computer 5. As well known in the art, the laser printer engine 7 includes a semiconductor laser for generating a laser beam, a motor for rotating a polygon mirror for deflecting the laser beam along a scanning line on a photoconductive drum, and a motor for rotating the drum. Since the details of the laser printer engine 7 are not essential to the understanding of the principle of this invention, no further description of the laser printer engine 7 is deemed necessary.

The control device 1 incorporates: a central processing unit (CPU) 2 for controlling a printing operation performed by the laser printer engine 7; a read-only memory (ROM) 3 storing various control programs as described below; a random-access memory (RAM) 4 having a temporary data storage function; an input/output interface 6 through which the control device 1 is connected to the host computer 6; a printer engine interface 8 through which the control device 1 is connected to the laser printer engine 7; and a bus 9 for interconnecting the above-indicated elements 2-4, 6,8.

The control device 1 receives from the host computer 5 batches of print data representative of printing jobs to be performed by the laser printer engine 7. Generally, a batch of print data includes character codes representative of alphabetic letters, numerals, symbols and other characters, and further includes various control codes which influence the printing according to the character codes. The control codes include mode-determinative codes which are associated with the determination or selection of one of a plurality of operation modes available on the present laser printer 1, 7.

The ROM 3 of the control device 1 incorporates a PROGRAM memory 3a and a POINT-TABLE memory 3b. The PROGRAM memory stores various control programs such as a main control program illustrated in the flow chart of FIG. 2 and a 4-secs. interruption sub-routine illustrated in the flow chart of FIG. 3. The POINT-TABLE memory 3b stores three point tables A, B and C as shown in FIGS. 4A, 4B and 4C which correspond to respective three different operation modes A, B and C available on the present laser printer 1, 7, which is capable of emulating two or more different types of printers other than the present laser printer. For the purpose of explanation of the present embodiment, it is assumed that the operation modes A, B and C are are also available on respective three different types of printers which the present laser printer can emulate. The function of the point tables A, B, C of FIGS. 4A–4C will be described.

On the other hand, the RAM 4 incorporates a mode determination buffer 4a, a print data memory 4b, a first register 4c, a second register 4d and a third register 4e. In operation of the laser printer, a batch of print data received from the host computer 5 is first stored in the print data memory 4b, and then at least a predetermined volume of the initial or leading portion of the received print data stored in the memory 4b is stored in the mode determination buffer 4a, so that one of the different operation modes of the present laser printer is selected for the received batch of print data, on the basis of the print data stored in the mode determination buffer 4a, as described below in detail. The registers 4c, 4d and 4e are adapted to store information on the sums ΣA, ΣB and ΣC of points to be given to all mode-determinative codes included in the portion of the print data stored in the memory 4a. These sums are obtained as described below, and correspond to the three different operation modes A, B and C.

The point tables A, B, C shown in FIGS. 4A, 4B and 4C list predetermined points to be given to the individual mode-determinative codes, with respect to the respective three different operation modes A, B and C. The points listed in each point table are determined so as to indicate the degrees of probability that the individual mode-determinative codes are included in the batches of print data which are written so as to be executed in the respective operation modes A, B and C. For example, the point to be given to the mode-determinative code "ESC B" is "70" for the operation mode A, while the points to be given to the same code is "50" and "30" for the operation modes B and C, respectively. This means that if the code "ESC B" is found in the received print data, the probability that the print data are written or formulated to perform a printing operation in the operation mode A is higher than the probability that the same print data are written to perform the printing operation in the operation mode B or C. Further, a higher degree of probability is given to the operation mode B than to the operation mode C, with respect to the code "ESC B".

To sum up the points to be given to all the mode-determinative codes included in the print data stored in the mode determination buffer 4a of the RAM 4, for each of the three operation modes A, B and C, the CPU 2 first detects the mode-determinative codes stored in the buffer 4a, and then scans the point tables A, B, C in the POINT-TABLE memory 3b to determine the points to be given to each of the detected mode-determinative codes, for the three operation modes A, B, C. The points of all the detected mode-determinative codes are summed to obtain a total score or a sum for each operation mode A, B, C. For this summation, the first, second and third registers 4c, 4d and 4e are used, as described below by reference to the flow chart of FIG. 3. The CPU 2 determines or select one of the operation modes A, B, C which has the largest sum. If the print data stored in the buffer 4a include only the codes "ESC A" and "ESC B", by way of example, the sums ΣA, ΣB and ΣC of the points for the three modes A, B and C are "145", "55" and "105", respectively. In this case, therefore, the operation mode A is selected as the effective operation mode in which the laser printer operates to perform a printing operation according to the received batch of print data stored in the print data memory 4b.

Referring next to the flow charts of FIGS. 2 and 3, there will be described an operation of the present laser printer 1, 7.

The main control routine stored in the PROGRAM memory 3a of the ROM 3 of the control device 1 is executed by the CPU 2 when the laser printer 1, 7 is turned on. The routine is started with step S1 in which the CPU 2 implements a self-diagnostic test, and initializes or resets the RAM 4. The initialization of the RAM 4 includes resetting of the registers 4c, 4d and 4e. The control flow then goes to step S2 to determine whether the control device 1 has commenced the reception of a batch of print data from the host computer 5 for storage of the received print data in the print data memory 4b, or not. Step S2 is repeatedly implemented until a batch of print data is received from the host computer 5.

When an affirmative decision (YES) is obtained in step S2, that is, when the control device 1 starts receiving a batch of print data from the host computer 5, the received batch of print data is stored in the print data memory 4b, according to a sub-routine not shown. At the same time, the CPU 2 starts measuring a time lapse after the commencement of reception of the print data from the host computer 5. When a period of four seconds has elapsed after the commencement of reception of the print data from the host computer 5, step S3 is implemented to perform a 4-secs. interruption sub-routine of FIG. 3 for determining one of the operation modes A, B or C as the effective operation mode. This sub-routine includes a step of storing at least the initial or leading portion of the received print data (stored in the memory 4b) in the mode determination buffer 4a, as described below. Step S3 is followed by step S4 in which the laser printer engine 7 is activated to perform a printing operation in the determined effective operation mode according to the batch of print data stored in the print data memory 4b.

Figure 2:
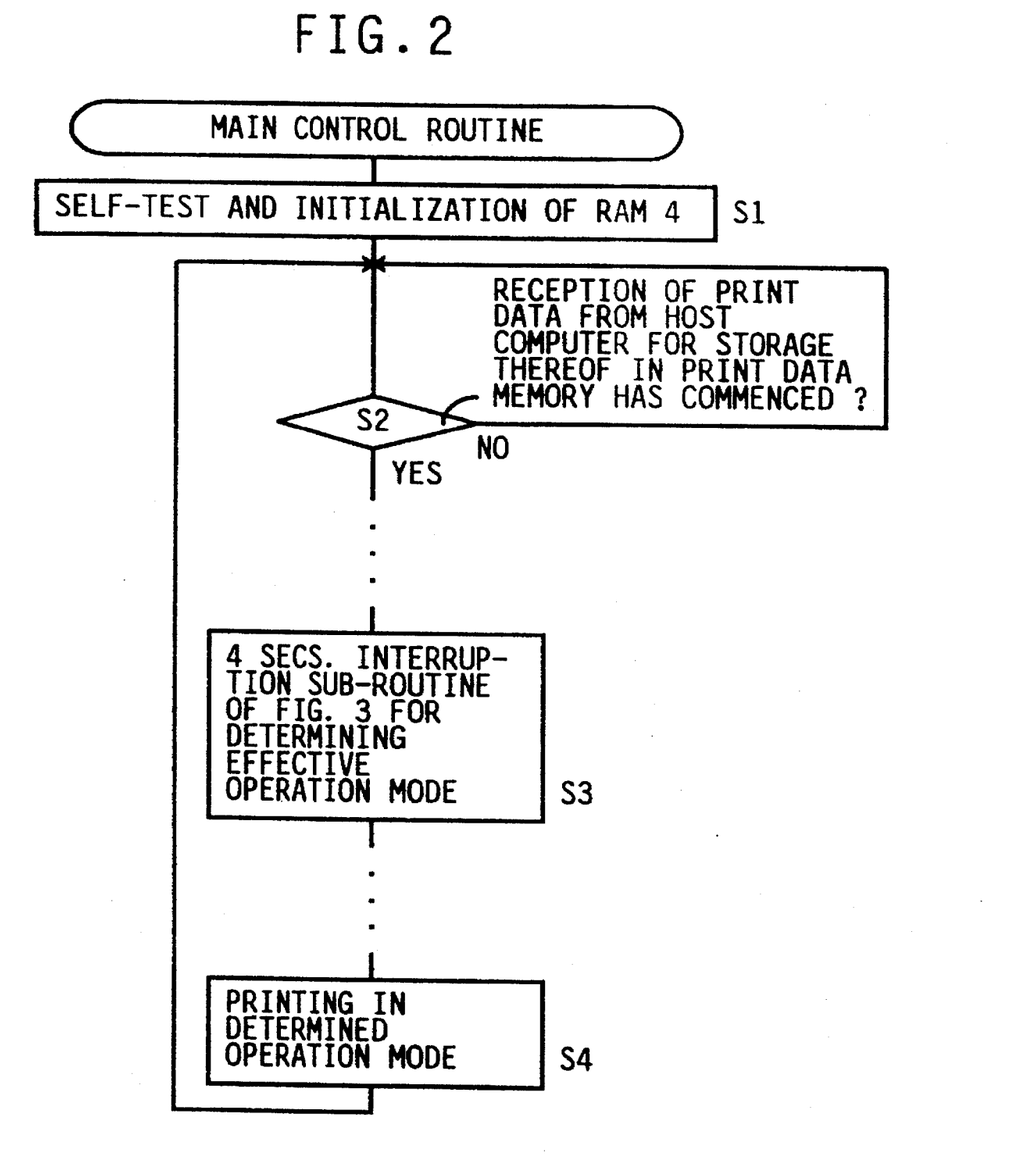
FIG. 2 is a flow chart illustrating a main control routine executed by a control device of the printer controller of FIG. 1.
Figure 3:
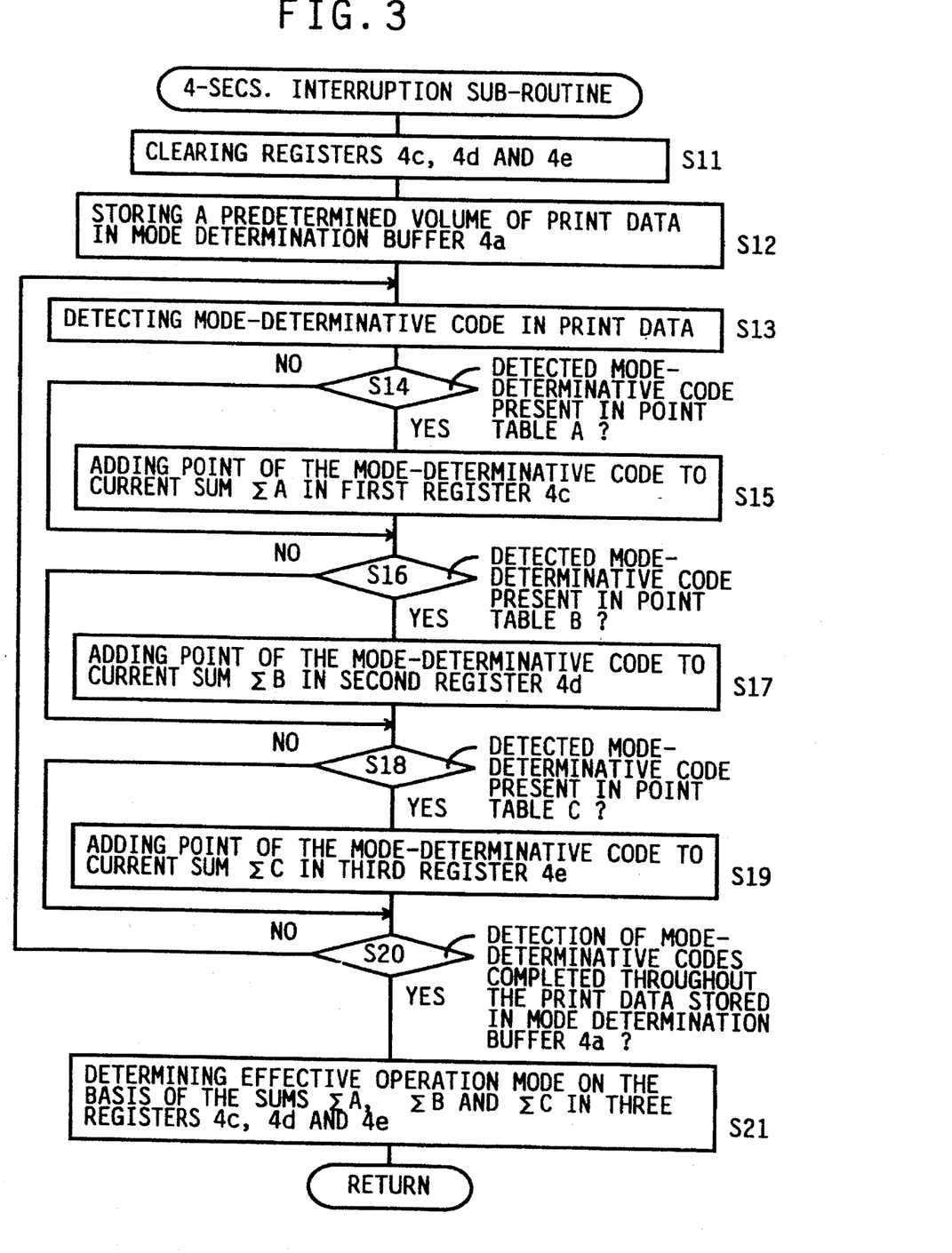
FIG. 3 is a flow chart illustrating an interruption subroutine executed in step S3 of the main control routine of FIG. 2, for determining the effective operation mode in which the controller operates according to each received batch of print data.
Figure 4A:
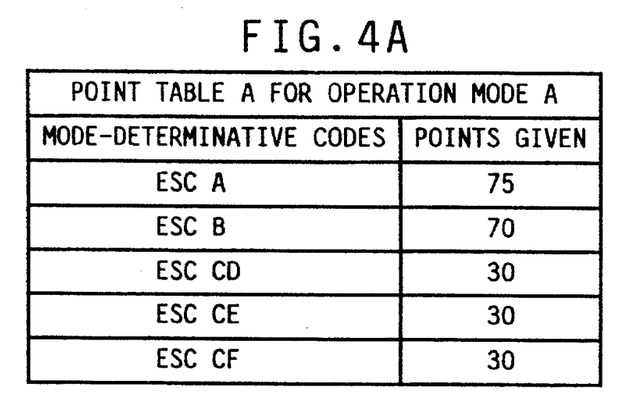
FIGS. 4A, 4B and 4C are views indicating three point tables stored in a point-table memory of the control device, which correspond to three different operation modes available on the controller.
Figure 4B:
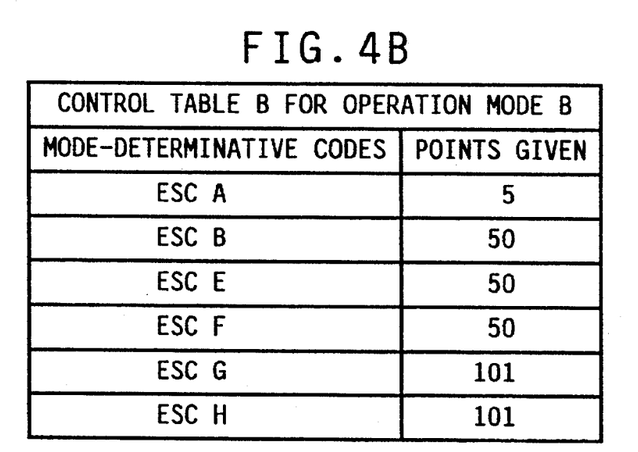
Figure 4C:
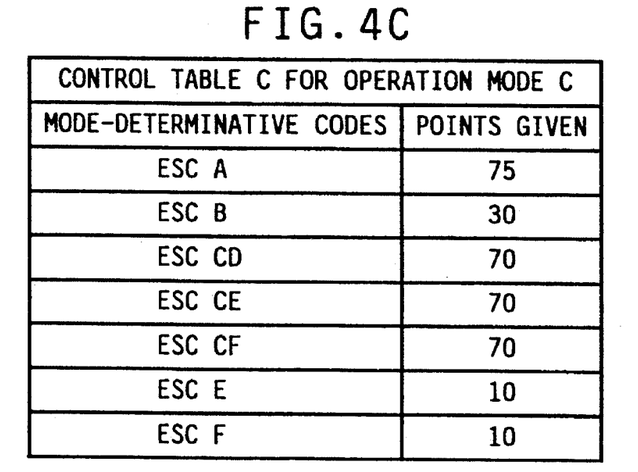

Before the period of four seconds has passed after the commencement of reception of a batch of print data, steps S2 and S4 are repeatedly implemented, without implementation of step S3 (without execution of the interruption sub-routine of FIG. 3). During this period, the interruption sub-routine is not executed, and the effective operation mode is not determined, whereby the laser printer engine 7 is not activated. That is, step S3 is implemented only after the period of four seconds has passed after the affirmative decision (YES) is obtained in step S2.

As a result of repeated implementation of steps S2 and S4, the period of four seconds has passed after the affirmative decision (YES) is obtained for the first time in step S2, namely, after the print data memory 4b has commenced storing a batch of print data received from the host computer 5. Consequently, the interruption sub-routine of FIG. 3 is executed. A batch of print data is interpreted to mean any volume of print data which is executed in the same operation mode or which does not involve a change in the operation mode (e.g., from the operation mode A to the operation mode B). For example, such volume of print data represents a certain document which is printed in the same type style and the same character size, with the same image resolution value.

The interruption sub-routine in step S3 will be described in detail, by reference to the flow chart of FIG. 3.

Initially, step S11 is implemented to clear the first, second and third registers 4c, 4d and 4e, which are adapted to store information indicative of the sums $\Sigma A$, $\Sigma B$ and $\Sigma C$. Then, step S12 is implemented to store in the mode determination buffer 4a a predetermined volume of the print data stored in the print data memory 4b, starting from the beginning of the print data. Therefore, at least a predetermined volume of the initial or leading portion of the received print data is stored in the buffer 4a. Since the present sub-routine is started four seconds after the commencement of storage of the received print data in the print data memory 4a, the predetermined volume of the print data to be stored in the buffer 4a does not exceed a volume that can be stored in the print data memory 4b during the initial period of four seconds after the commencement of reception of the print data from the host computer 5.

The control flow then goes to step S13 to detect a mode-determinative code included in the print data stored in the mode determination buffer 4a. Step S13 is followed by step S14 to determine whether the detected mode-determinative code (first mode-determinative code, in the case of the first cycle of execution of the present sub-routine) and the corresponding point are listed in the point table A in the POINT-TABLE memory 3b, or not. If an affirmative decision (YES) is obtained in step S14, step S15 is implemented to read out from the point table A the point which corresponds to the detected mode-determinative code. The read-out point is added to the current sum $\Sigma A$ represented by the data stored in the first register 4c. If the first mode-determinative code detected in the print data stored in the buffer 4a is "ESC A", for example, point "75" is added to the current sum $\Sigma A$ in the first register 4c. Then, the control flow goes to step S16.

If a negative decision (NO) is obtained in step S14, the control flow goes directly to step S16 to determine whether the detected mode-determinative code and the corresponding point are listed in the point table B in the POINT-TABLE memory 3b, or not. If an affirmative decision (YES) is obtained in step S16, step S17 is implemented to read out from the point table B the point corresponding to the detected mode-determinative code, and to add the read-out point to the current sum $\Sigma B$ stored in the second register 4d. If the first mode-determinative code is "ESC B", for example, point "50" is added to the sum $\Sigma B$. The control flow then goes to step S18.

If a negative decision (NO) is obtained in step S16, this step S16 is followed by step S18 to determine whether the detected mode-determinative code and the corresponding point are listed in the point table C, or not. If an affirmative decision (YES) is obtained in step S18, step S19 is implemented to read out from the point table C the point corresponding to the detected mode-determinative code, and to add the point to the current sum $\Sigma C$ stored in the third register 4e. If the first mode-determinative code is "ESC CD", for example, point "70" is added to the sum $\Sigma C$. The control flow then goes to step S20. Step S18 is followed by step S20 if a negative decision (NO) is obtained in step S18.

Step S20 is implemented to determine whether the entire volume of the print data stored in the mode determination buffer 4a has been scanned to detect the mode-determinative codes, or not, namely, whether the mode-determinative code detected in step S13 is the last mode-determinative code included in the print data stored in the buffer 4a, or not. If any mode-determinative code is still left in the print data in the buffer 4a, a negative decision (NO) is obtained in step S20, the control flow returns to step S13, and the summing operations to update the sums $\Sigma A$, $\Sigma B$ and $\Sigma C$ are effected with respect to the next mode-determinative code detected in step S14. Thus, steps S14 through S20 are repeatedly implemented for all the mode-determinative codes included in the print data stored in the mode determination buffer 4a.

It will be understood that some mode-determinative codes (e.g., "ESC A" and "ESC B") are given the appropriate points for all of the three different operation modes A, B and C, while some other mode-determinative codes (e.g., "ESC G" and "ESC H") are given the appropriate points for only one or two of the operation modes A, B and C. As described above, the sums $\Sigma A$, $\Sigma B$ and $\Sigma C$ for the three operation modes A, B and C are obtained. If the print data stored in the buffer 4a include only the codes "ESC A" and "ESC B", the final sums $\Sigma A$, $\Sigma B$ and $\Sigma C$ are "145", "55" and "105", respectively, as previously mentioned for illustrative purpose only.

When the sums $\Sigma A$, $\Sigma B$ and $\Sigma C$ have been obtained for all the mode-determinative codes included in the print data stored in the buffer 4a, step S20 is followed by step S21 to determine the effective operation mode, on the basis of the sums $\Sigma A$, $\Sigma B$, $\Sigma C$. If the sum $\Sigma A$ is the largest, the operation mode A is determined as the effective operation mode. Similarly, the operation mode B or C is determined as the effective mode, if the sum $\Sigma B$ or $\Sigma C$ is the largest. In the above specific example, the operation mode A whose sum $\Sigma A$ is "145" is selected as the effective operation mode.

Upon completion of the interruption sub-routine of FIG. 2 (upon completion of step S21), the control flow returns to the main control routine of FIG. 2, whereby the received batch of data stored in the print data memory 4b is executed in step S4, to perform a printing operation in the determined effective operation mode, one of the three operation modes A, B and C which is determined in step S21 of the sub-routine of FIG. 3.

As explained above, the present embodiment of the invention is adapted such that the sums $\Sigma A$, $\Sigma B$ and $\Sigma C$ of points to be given to all the mode-determinative codes included in the print data stored in the buffer 4a are obtained for all the different operation modes A, B and C, by reference to the point tables A, B and C in the POINT-TABLE memory 3b, which are formulated in view of the probability that the individual mode-determinative codes are actually included in relevant batches of print data when these batches are written to be executed in the operation modes A, B and C. According to this arrangement, the sums $\Sigma A$, $\Sigma B$ and $\Sigma C$ differ due to the different points to be given to the same mode-determinative codes depending upon the specific operation modes A, B and C. Therefore, the effective operation mode for a given batch of print data can be determined with high accuracy and reliability, even if a certain mode-determinative code or codes is/are used for two or more different operation modes.

Further, if the volume of the received batch of print data requires more than four seconds to be stored in the print data memory 4b, the effective operation mode is determined soon after the interruption sub-routine is terminated, that is, soon after the elapse of four seconds after the commencement of reception of the print data from the host computer 5. In this case, therefore, the printing operation is effected as the print data are stored in the print memory 4b (while the terminal portion of the print data is being stored in the memory 4b), whereby the printing efficiency can be improved.

In the present embodiment, the three operation modes A, B and C are available on the laser printer 1, 7. However, the number of the operation modes available may be suitably changed. For instance, the laser printer may have only two operation modes, or four or more operations modes. In the case where only two operation modes are available, the sum of points of the mode-determinative codes may be obtained for only one of the two modes, so that the obtained sum is compared with a predetermined threshold value. For instance, the operation mode whose sum exceeds a threshold value of "100" is selected as the effective operation mode.

In the case where the volume of a batch of print data is such that the print data can be stored in the print data memory 4b within a period of four seconds, a next batch of print data may be received within this period. To execute the 4 secs. interruption sub-routine of FIG. 3, two or more times are required to measure the timers lapse after the commencement of reception of two or more batches of print data. However, the present embodiment uses only one timer since the control device 1 is not adapted to receive two or more batches of print data within the period of four seconds.

Figure 5:
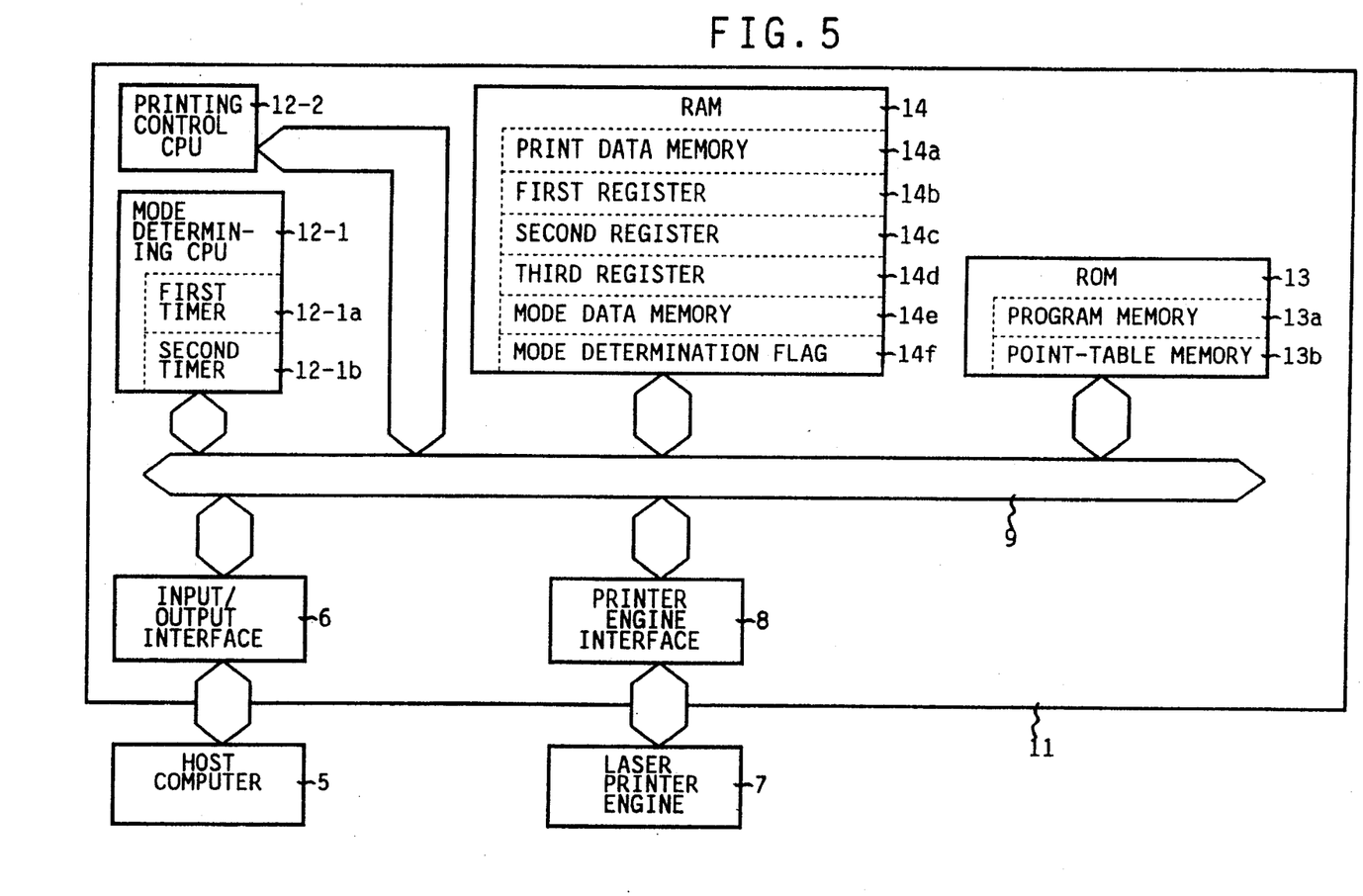
FIG. 5 is a schematic block diagram corresponding to that of FIG. 1, which shows a laser printer having a controller constructed according to a second embodiment of this invention.

Referring next to FIGS. 5–8, there will be described a laser printer having the laser printer engine 7, and a printer controller in the form of a control device 11 constructed according to a second embodiment of this invention. As shown in FIG. 5, the controller device 11 has a mode determining CPU 12-1, a printing control CPU 12-2, a ROM 13 and a RAM 14. In the other aspects, the present laser printer 11, 7 is similar to the laser printer 1, 7 according to the first embodiment described above.

Figure 6:
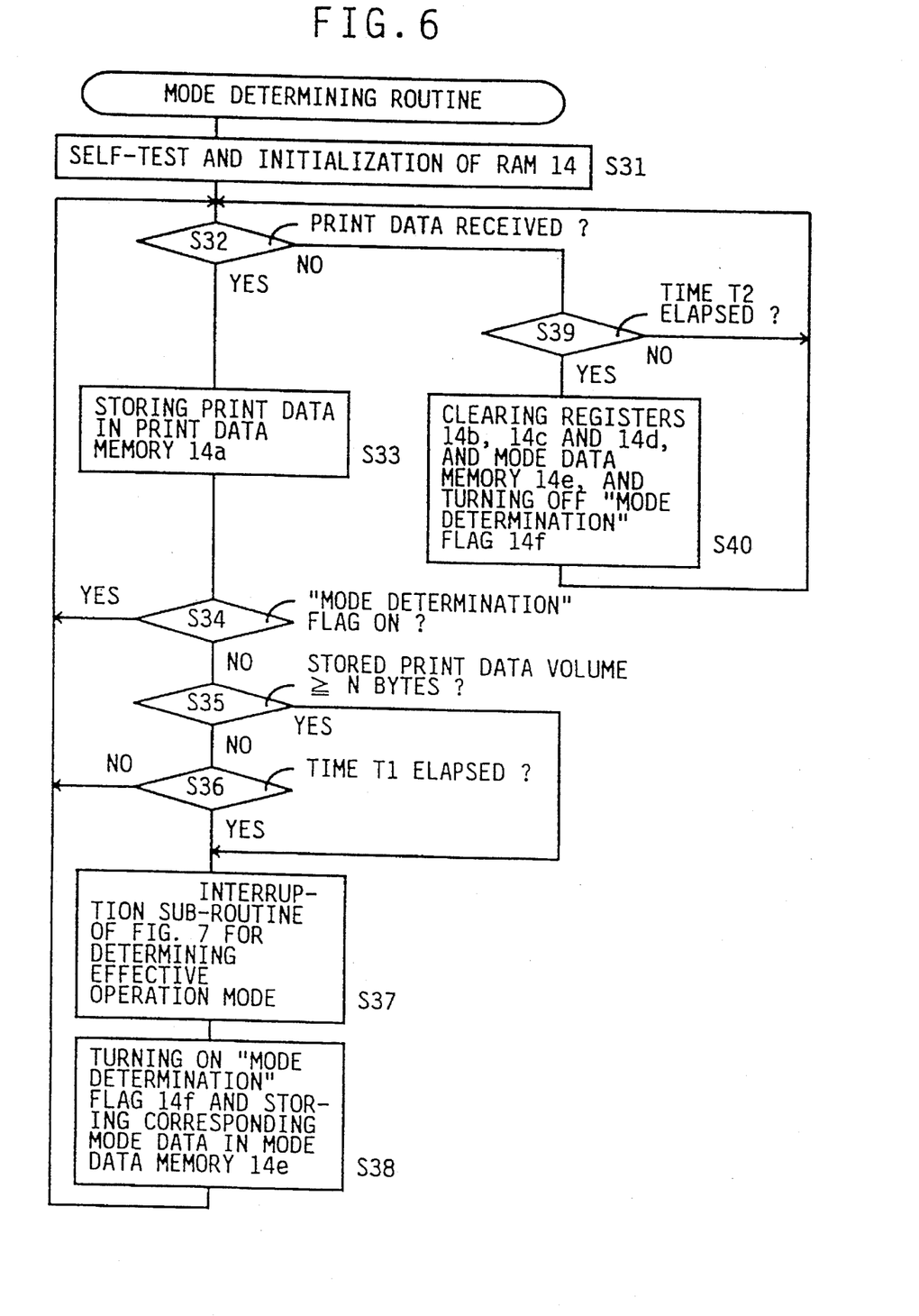
FIG. 6 is a flow chart illustrating a mode determining routine for determining the effective operation mode in the second embodiment of the invention.
Figure 7:
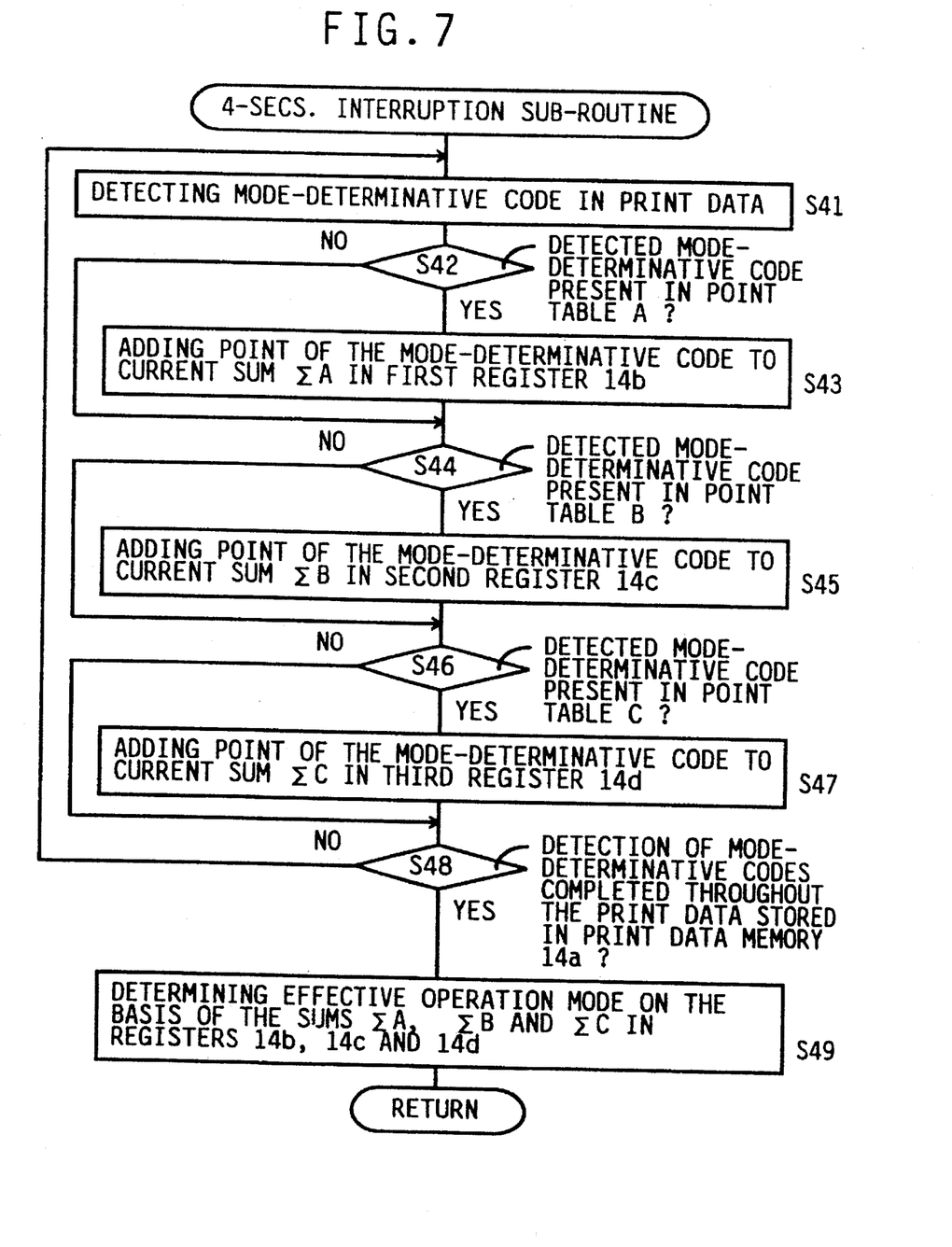
FIG. 7 is a flow chart illustrating an interruption subroutine executed in step S37 of the routine of FIG. 6.
Figure 8:
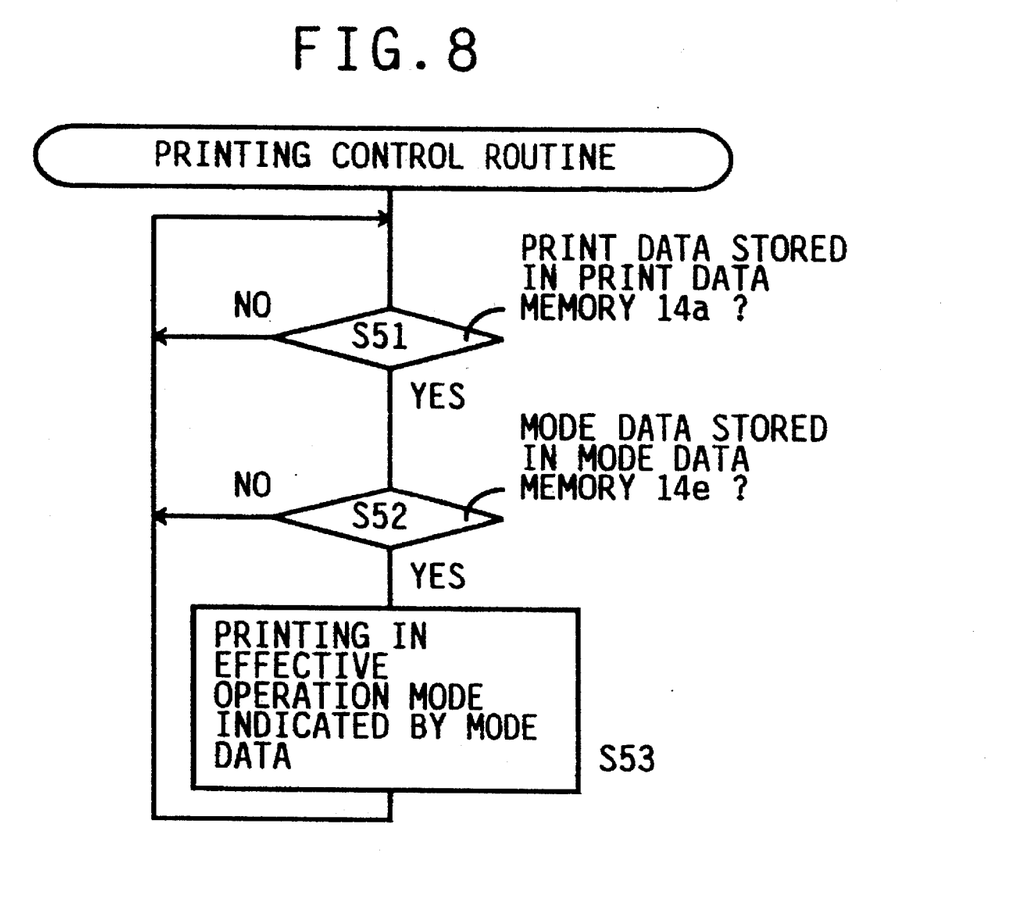
FIG. 8 is a flow chart illustrating a printing control routine for performing a printing operation in the second embodiment.

The ROM 13 has a PROGRAM memory 13a which stores a mode determining routine illustrated in the flow chart of FIG. 6, and a printing control routine illustrated in the flow chart of FIG. 8. The mode determining routine of FIG. 6 includes step S37 for determining the effective operation mode according to a 4-secs. interruption sub-routine illustrated in the flow chart of FIG. 7. The ROM 13 also has a POINT-TABLE memory 13b which stores three point tables as illustrated in FIGS. 4A, 4B and 4C, which are formulated on the same concept as described above with respect to the first embodiment.

The RAM 14 includes a print data memory 14a, a first register 14b, a second register 14c, a third register 14d, a MODE DATA memory 14e and a MODE DETERMINATION flag 14f. The print data memory 14a is similar to the memory 4b in the first embodiment, and the three registers 14b, 14c and 14d are identical with the registers 4c, 4d and 4e in the second embodiment. The MODE data memory 14e is adapted to store mode data representative of the effective operation mode determined in step S37 of the mode determining routine of FIG. 6 (sub-routine of FIG. 7), while the MODE DETERMINATION flag 14f is used in the routine of FIG. 6 as described below.

The mode determining CPU 12-1 is adapted to execute the mode determining routine of FIG. 6, while the printing control CPU 12-2 is adapted to execute the printing control routine of FIG. 8. Since the two CPUs 12-1 and 12-2 are provided in this second embodiment, the two routines of FIGS. 6 and 8 can be executed concurrently.

Referring to the flow chart of FIG. 6, the mode determining routine will be described.

The mode determining routine is started with step S31 similar to step S1, to perform a self-diagnostic test and initialize the RAM 14. The initialization of the RAM 14 includes resetting or turning off the MODE DETERMINATION flag 14f and clearing the three registers 14b, 14c and 14d.

Step S31 is followed by step s32 to determine whether a batch of print data is received from the host computer 5, or not. If an affirmative decision (YES) is obtained in step S32, the control flow goes to step S33 to store the received batch of print data in the print data memory 14a of the RAM 14. Step S32 is followed by step S34 to determine whether the MODE DETERMINATION flag 14f is set at ON or not. Since this flag 14f is reset to OFF in step S31, a negative decision (NO) is obtained in the first cycle of execution of the mode determining routine. If the negative decision is obtained in step S34, step S35 is implemented to determine whether the volume of the print data already stored in the print data memory 14a is equal to or larger than a predetermined number (N) of bytes. The number N is 512, for example. If an affirmative decision (YES) is obtained in step S35, the control flow goes to step S37, skipping the next step S36. If a negative decision (NO) is obtained in step S35, that is, if the volume of the print data currently stored in the print data memory 14a is smaller than N bytes, step S35 is followed by step S36 to determine whether a predetermined time T1 has elapsed after the affirmative decision (YES) is obtained in step S32 for the first time. This determination is effected on the basis of the content of a first timer 12-1a provided in the mode determining CPU 12-1. The time T1 is 0.5 sec. or so, for example.

If the volume of the print data already stored in the print data memory 14a is smaller than N bytes and the time T1 has not expired, the control returns to step S32, and steps S32-S36 are repeatedly implemented until the affirmative decision is obtained in step S35 or in step S36. It will be understood that steps S35 and S36 are provided to start executing the interruption sub-routine in step S37, only after a predetermined volume of print data has been stored in the print data memory 14a.

When the affirmative decision (YES) is obtained in step S35 or S36, the interruption sub-routine of FIG. 7 is executed in step 37, to determine the effective operation mode. The sub-routine of FIG. 7 consists of steps S41-S49 which are identical to steps S13-S21, respectively. Step S37 is followed by step S38 in which the MODE DETERMINATION flag 14f is set to ON, and mode data indicative of the effective operation mode determined in step S37 (sub-routine of FIG. 7) are stored in the MODE DATA memory 14e. Then, the control flow returns to step S32.

After the effective operation mode has been determined in step S37, an affirmative decision (YES) is obtained in step S34, whereby steps S32-S34 are repeatedly implemented to store the remaining portion of the batch of print data in the print data memory 14a.

While the mode determining routine of FIG. 6 is being executed, the printing control routine of FIG. 8 is concurrently executed to perform a printing operation in the determined effective operation mode according to the print data. More specifically described, step S51 is initially implemented to determine whether any volume of print data is stored in the print data memory 14a, or not. This step S51 is repeated until a batch of print data is received from the host computer 5, or until the affirmative decision (YES) is obtained in step S32 of the routine of FIG. 6. If an affirmative decision (YES) is obtained in step S51, the control flow goes to step S52 to determine whether the effective operation mode has been already determined, that is, whether the mode data indicative of any operation mode are stored in the MODE DATA memory 14e of the RAM 14, or not. Steps S51 and S52 are repeatedly executed until step S38 of the mode determining routine has been implemented.

When an affirmative decision (YES) is obtained in step S52, that is, when the mode data are stored in the memory 14e in step S38, step S53 is implemented to activate the laser printer engine 7 to perform a printing operation in the determined mode according to the print data stored in the print data memory 14a.

As in the first embodiment, the printing operation can be started even before the entire volume of the print data received from the host computer 5 has been stored in the print data memory 14a, or even while steps S32-S34 are repeatedly implemented. More specifically, the printing operation can be started soon after the volume of the print data stored in the memory 14a has become equal to N bytes, or soon after the time T1 has passed after the commencement of reception of the print data from the host computer 5. Thus, the printing efficiency can be improved.

While no print data are received from the host computer 5, a negative decision (NO) is obtained in step S32, and the control flow goes to step S39 to determine whether a predetermined time T2 has elapsed after the negative decision (NO) is obtained in step S32 for the first time. In other words, step S39 is provided to measure a time duration during which no print data are received from the host computer 5, and to determine whether this time duration has exceeded the predetermined threshold T2. This determination is effected on the basis of the content of a second timer 12-1b provided in the CPU 12-1. The time T2 is 4 seconds or so, for example. Steps S32 and S39 are repeatedly implemented until the predetermined time T2 has passed. When the time T2 has passed without reception of a batch of print data from the host computer 5, an affirmative decision (YES) is obtained in step S39, and the control flow goes to step S40 in which the first, second and third registers 14b, 14c and 14d, and the MODE DATA memory 14e are cleared, and the MODE DETERMINATION flag 14f is turned OFF.

Step S40 is followed by step S32 to wait for a next batch of print data from the host computer 5. The significance of steps S39 and S40 lies in that a batch of print data received after an elapse of the time T2 during which no print data are received can be considered to be a batch of print data which is not a part of the preceding batch of print data received and which may be written to perform a printing operation in a mode different from that of the preceding batch of print data. Based on this concept, the effective operation mode is determined for the batch of data received after the elapse of the time T2, by implementing steps S32-S38 as described above. In this manner, the operation modes are determined for successive batches of print data received from the host computer 5, according to the mode determining routine of FIG. 6, which includes the interruption sub-routine of FIG. 7.

The present second embodiment is also capable of determining the effective operation modes for each batch of print data, with high accuracy and reliability, owing to the interruption sub-routine which utilizes the point tables A, B, C as indicated in FIGS. 4A, 4B and 4C, as described in detail with respect to the first embodiment of FIGS. 1–3.

While the present invention has been described in its presently preferred embodiments, with a certain degree of particularity, for illustrative purpose only, it is to be understood that the present invention may be otherwise embodied, with various changes, modifications and improvements, which may occur to those skilled in the art, without departing from the spirit and scope of the invention defined in the following claims.

For instance, the principle of this invention is equally application to a printer controller other than a laser printer, such as an impact dot-matrix printer using print wires, for example.

What is claimed is:

1. A printer controller having a function of emulating a plurality of types of printers which operate in different operation modes, said printer controller being operable according to one of a plurality of batches of print data in a selected one of said operation modes of said plurality of printers, said printer controller comprising:

print data memory means for storing a received batch of print data, said received batch of print data including character codes and mode-determinative codes;

point-table memory means for storing point tables corresponding to said different operation modes, each of said point tables listing predetermined points given to said mode-determinative codes, respectively, said predetermined points being indicative of degrees of probability that each of said different operation modes which corresponds to said each point table is said selected operation modes;

mode determining means for scanning said point tables, summing the points of said mode-determinative codes included in said received batch of print data, to obtain a sum of said points for each of said different operation modes, and determining one of said operation modes as said selected operation mode on the basis of said sums obtained for said different operation modes; and commanding means for activating said mode determining means when a predetermined time has lapsed after commencement of an operation to store said received batch of print data in said print data memory means.

2. A printer controller according to claim 1, wherein said mode-determinative codes include at least one of control codes which influence a printing operation according to said character codes of said print data.

3. A printer controller according to claim 1, further comprising:

time measuring means for measuring an interruption time for which no print data are received for storage in said print data memory means; and control means for resetting said mode determining means after said interruption time measured by said time measuring means has exceeded a predetermined threshold, and activating said mode determining means when a next batch of print data is received.

4. A printer controller according to claim 1, wherein said predetermined points given to said mode-determinative codes indicate degrees of probability that the corresponding mode-determinative codes are included in each of said plurality of batches of print data which is written so as to be execute in each of said different operation modes.

5. A printer controller according to claim 1, wherein said mode determining means includes code detecting means for detecting said mode-determinative codes included in said received batch of print data, said mode determining means reading out from said point tables said predetermined points which correspond to said mode-determinative codes.

6. A printer controller according to claim 1, further comprising code detecting means for detecting said mode-determinative codes included in said received batch of print data, and wherein said mode determining means reads out from said point tables said predetermined points which correspond to said mode-determinative codes.

7. A printer controller according to claim 1, wherein said commanding means comprises means for activating said mode determining means when a predetermined volume of said received batch of print data has been stored in said print data memory means, if said predetermined volume of said received batch of print data has been stored in said print data memory means before said predetermined time has elapsed after commencement of the operation to store said received batch of print data in said print data memory means.

8. A printer controller according to claim 1, wherein said mode determining means operates to execute a mode determining interruption routine for determining said selected operation mode for said received batch of print data, said commanding means activating said mode determining means said predetermined time after the commencement of said storing operation.

9. A printer controller according to claim 1, wherein said mode determining means determines as said selected operation mode one of said operation modes which has a largest one of said sums.

10. A printer comprising a printer controller as defined in claim 1, and a printer engine for performing a printing operation according to said received batch of said print data in said selected operation mode determined by said mode determining means.

11. A printer controller having a function of emulating a plurality of types of printers which operate in different operation modes, said printer controller being operable according to one of a plurality of batches of print data in a selected one of said operation modes of said plurality of printers, said printer controller comprising:

print data memory means for storing a received batch of print data, said received batch of print data including character codes and control codes;

code detecting means for detecting said control codes included in said received batch of print data, said control codes influencing a printing operation according to said received batch of print data;

point-table memory means for storing point tables corresponding to said different operation modes, each of said point tables listing predetermined points given to said control codes, respectively, said predetermined points being indicative of degrees of probability that the corresponding control codes are included in each of said plurality of batches of print data which is written so as to execute in each of said different operation modes;

mode determining means for scanning said point tables, summing the points of said control codes included in said received batch of print data, to obtain a sum of said points for each of said different operation modes, and determining one of said operation modes as said selected operation mode on the basis of said sums obtained for said different operation modes; and commanding means for activating said mode determining means when a predetermined time has lapsed after commencement of an operation to store said received batch of print data in said print data memory means.

12. A printer controller according to claim 11, wherein said commanding means comprises means for activating said mode determining means when a predetermined volume of said received batch of print data has been stored in said print data memory means, if said predetermined volume of said received batch of print data has been stored in said print data memory means before said predetermined time has elapsed after commencement of the operation to store said received batch of print data in said print data memory means.

13. A printer controller according to claim 11, wherein said mode determining means comprises means for determining as said selected operation mode one of said operation modes which has a largest one of said sums.

14. A method for selecting one of a plurality of different operation modes in which a printer operates to perform a printing operation according to a batch of print data, said method comprising the steps of:

receiving said batch of print data, said batch of print data including character codes and mode-determinative codes;

upon lapsing of a predetermined time after the commencement of an operation to receive said batch of print data, scanning point tables corresponding to said different operation modes, each of said point tables listing predetermined points given to said mode-determinative codes, respectively, said predetermined points being indicative of degrees of probability that each of said different operation modes which corresponds to said each point table is selected as an operation mode in which said printing operation is performed by said printer; and summing the points of said mode-determinative codes included in said batch of print data, to obtain a sum of said points for each of said different operation modes, and selecting one of said operation modes on the basis of said sums obtained for said different operation modes.

15. A method according to claim 14, further comprising a step of detecting a first moment when said predetermined time has elapsed after commencement of the operation to receive said batch of print data, and a second moment when a predetermined volume of said batch of print data has been received, and wherein said step of scanning point tables comprises starting scanning said point tables at an earlier one of said first and second moments.

16. A method according to claim 14, wherein said step of summing the points of said mode-determinative codes and selecting one of said operation modes on the basis of said sums comprises selecting one of said operation modes which has a largest one of said sums.

* * * * *